US 11,577,812 B2

(12) United States Patent
Panousis et al.

(10) Patent No.: US 11,577,812 B2
(45) Date of Patent: Feb. 14, 2023

(54) BALLAST WATER TREATMENT APPARATUS AND BALLAST WATER TREATMENT SYSTEM

(71) Applicant: ABB Schweiz AG, Baden (CH)

(72) Inventors: Emmanouil Panousis, Baden (CH); Frank Kassubek, Rheinfelden (DE); Torsten Votteler, Niederrohrdorf (CH); Gabriel Ortiz, Zürich (CH); Enea Bianda, Baden (CH); Jan Carstensen, Waldshut-Tiengen (DE); Angelos Garyfallos, Niederrohrdorf (CH); Seila Rodriguez-Vilches, Thalwil (CH)

(73) Assignee: ABB SCHWEIZ AG, Baden (CH)

(*) Notice: Subject to any disclaimer, the term of this patent is extended or adjusted under 35 U.S.C. 154(b) by 11 days.

(21) Appl. No.: 17/069,114

(22) Filed: Oct. 13, 2020

(65) Prior Publication Data

US 2021/0031896 A1 Feb. 4, 2021

Related U.S. Application Data

(63) Continuation of application No. PCT/EP2019/059500, filed on Apr. 12, 2019.

(30) Foreign Application Priority Data

Apr. 13, 2018 (EP) ..................................... 18167319

(51) Int. Cl.
*B63J 4/00* (2006.01)
*C01B 13/10* (2006.01)
(Continued)

(52) U.S. Cl.
CPC ........... *B63J 4/002* (2013.01); *B01F 23/2323* (2022.01); *B01F 25/31242* (2022.01);
(Continued)

(58) Field of Classification Search
CPC ...... C02F 9/00; C02F 1/78; C02F 1/66; C02F 1/32; C02F 1/4674; C02F 1/20;
(Continued)

(56) References Cited

U.S. PATENT DOCUMENTS 9,073,766 B2 * 7/2015 Fahs, II .................. C02F 1/725
10,160,668 B2 * 12/2018 Namihira ................ B03C 11/00
(Continued)

FOREIGN PATENT DOCUMENTS

CA 2595734 A1 8/2006
CN 1986441 A * 6/2007
(Continued)

OTHER PUBLICATIONS

European Communication pursuant to Article 94(3) EPC, issued by the European Patent Office, regarding corresponding patent application Serial No. 19717882.5; dated Oct. 26, 2021; 4 pages.
(Continued)

*Primary Examiner* — Cameron J Allen
(74) *Attorney, Agent, or Firm* — Greenberg Traurig, LLP

(57) ABSTRACT

A ballast water treatment apparatus and a ballast water treatment system having a ballast water treatment apparatus are provided. The ballast water treatment apparatus includes a ballast water transport line configured to transport ballast water between a first location and a second location, the transported ballast water being passed through at least one injector, and a plasma generation device configured to be fed with a feed gas optionally comprising oxygen, and configured to generate a feed gas plasma by a streamer type discharge in a discharge area to provide a treated gas at a treated-gas outlet. The injector includes a liquid passage having an area constructed such as to increase a velocity of the passed-through water in a region of increased velocity, and an injector gas inlet provided in the region of increased
(Continued)

velocity. The treated-gas outlet is in gaseous connection with the injector gas inlet.

19 Claims, 3 Drawing Sheets

(51) Int. Cl.
    *C02F 1/78*     (2023.01)
    *B01F 23/232*     (2022.01)
    *B01F 25/312*     (2022.01)
    *C02F 103/00*     (2006.01)
    *B01F 101/00*     (2022.01)

(52) U.S. Cl.
    CPC ............... *C01B 13/10* (2013.01); *C02F 1/78* (2013.01); *B01F 25/31251* (2022.01); *B01F 2101/305* (2022.01); *C02F 2103/008* (2013.01); *C02F 2303/04* (2013.01); *C02F 2305/023* (2013.01)

(58) Field of Classification Search
    CPC ............... C02F 1/004; C02F 2103/08; C02F 2103/008; C02F 2301/043; C02F 2303/04; C02F 2303/20; B01D 61/04; B01D 19/0068; B01D 19/0047; B01D 19/0042; C01F 1/72; C01F 1/76; C01F 1/46; C01F 1/52; C01F 9/00; B63J 4/002; B63B 13/00
    See application file for complete search history.

(56) References Cited

U.S. PATENT DOCUMENTS

| | | | | |
|---|---|---|---|---|
| 10,494,274 | B2 * | 12/2019 | Asami | .................. C02F 1/30 |
| 2003/0015481 | A1 | 1/2003 | Eidem | |
| 2004/0251215 | A1 | 12/2004 | Bai et al. | |
| 2013/0213899 | A1 | 8/2013 | Fahs, II et al. | |
| 2017/0275187 | A1 | 9/2017 | Asami et al. | |

FOREIGN PATENT DOCUMENTS

| | | | | |
|---|---|---|---|---|
| CN | 100415412 | C * | 9/2008 | |
| CN | 201907997 | U | 7/2011 | |
| CN | 102501945 | A * | 6/2012 | |
| CN | 102689974 | A | 9/2012 | |
| EP | 3666736 | A1 * | 6/2020 | ............ C02F 1/4608 |
| KR | 20080092292 | A | 10/2008 | |
| KR | 20170121425 | A | 11/2017 | |
| WO | WO-2007144252 | A1 * | 12/2007 | ................ C02F 1/32 |
| WO | 2010136220 | A2 | 12/2010 | |
| WO | WO-2016096751 | A1 * | 6/2016 | ............ B01J 19/088 |

OTHER PUBLICATIONS

European Patent Office, International Search Report & Written Opinion issued in corresponding Application No. PCT/EP2019/059500, dated Jun. 26, 2019, 18 pp.
European Patent Office, Extended Search Report issued in corresponding Application No. 18167319.5, dated Aug. 2, 2018, 9 pp.
Kudo et al., "Oxidative DNA damage caused by pulsed discharge with cavitation on the bactericidal function," J. Phys. D: Appl. Phys., vol. 48, 2015, 12 pp.
Xiangying et al., "Treatment of Microalgae in Ballast Water Using Hydroxyl Radical in Accordance with the D-2 Ballast Water Discharge Standard," High Voltage Engineering, vol. 40, No. 1, 2014, pp. 232-236.
China First Office Action and Search Report, issued by the National Intellectual Property Administration, regarding corresponding patent application Serial No. CN 201980033658.3; dated May 6, 2022; 26 pages (with English Translation).
Ge Yuanjing, Zhang Guangqiu, Chen Qiang: "Plasma Science and Technology and Its Application in Industry" (Publisher: China Light Industry Press) (cited: pp. 82-86), 8 pages, Jan. 2011.

* cited by examiner

BALLAST WATER TREATMENT APPARATUS AND BALLAST WATER TREATMENT SYSTEM

TECHNICAL FIELD

The present disclosure relates to a ballast water treatment apparatus and to a ballast water treatment system.

RELATED ART

For travelling in a partially loaded or unloaded state, a cargo ship is typically equipped with one or more ballast water tank. In a seagoing vessel, the ballast water tanks are filled with seawater (saline water) at a first location which contributes to stabilization. The ship travels to a second location and discharges the ballast water.

Ballast water from the first location may contain biological species such as algae and oceanic plankton that are biologically invasive (i. e. introduced species) at the second location. Thus, it is legally required that ballast water is treated, or disinfected, before its discharge. A typical ballast water treatment process involves a filtration stage (a physical separation stage) and a disinfection stage. In the filtration stage, typically, solids having a particle size of >50 µm are removed. Examples for a filtration stage include backwashable mesh or disk filters, hydrocyclones or the like. Living organisms below these dimensions remain to be treated by the disinfection stage.

Most commonly, the disinfection stage involves an ultraviolet (LTV) treatment method or an electro-chlorination method. Regulations in some countries require that organisms released in a ballast water discharging process are actually dead; however, UV treatment is known to leave some organisms in a living, but non-viable stage. As the UV treatment mainly damages the DNA of organisms, it can render them non-reproductive. However, to actually kill the organisms, very high doses of UV are necessary, which leads to large energy consumption and reduces the treatment capacity of a UV-based disinfection stage. Some UV-based disinfection stage treatment methods involve a first disinfection process during charging the ballast water into the ballast water tanks, and a second disinfection process during the ballast water discharge, which makes this approach time consuming.

Electro-chlorination is an electrolytic process that needs a branch path, or side-stream path, branching off from the main ballast water stream. Electrolysis in saline water generates free chlorine that is an active oxidative species. The electrolyzed branched-off water is injected into the main ballast water, wherein the free chlorine and/or chlorine compounds generated therefrom disrupt the outer membrane of the living organisms inside the ballast water stream. However, free chlorine as well as some chlorine compounds are known to have long lifetime; thus, such substances have to be removed prior to discharging the treated water into the sea. Also, electrolysis is non-functional in brackish water or sweet water. Also, the level of salinity of the treated water directly affects the chlorine production. Moreover, electrolysis involves a production of hydrogen as a by-product, which may lead to security risks.

In recent years, other disinfection stage treatment methods have been employed, such as ozonization, UV-activated $TiO_2$ catalysis, and ultrasound cavitation, which typically have a high power demand. Thus, there is a need for an improved treatment approach in the disinfection stage of ballast water treatment.

SUMMARY OF THE DISCLOSURE

In a first aspect of the present disclosure, a ballast water treatment apparatus comprises a ballast water transport line and a plasma generation device. The ballast water transport line is configured to transport ballast water between a first location and a second location. The transported ballast water is passed through at least one injector. The plasma generation device is configured to be fed with a feed gas. The plasma generation device is further configured to generate a feed gas plasma by a streamer type discharge in a discharge area in order to provide a treated gas at a treated-gas outlet. The injector comprises a liquid passage. The liquid passage is constructed such as to increase a velocity of the passed-through water in a region of increased velocity. The injector further comprises an injector gas inlet that is provided in the region of increased velocity. The treated-gas outlet is in gaseous connection with the injector gas inlet.

An injector, as used herein, is generally a device having the liquid passage for passing through the ballast water, and the injector gas inlet at which a gas provided at the injector gas inlet is sucked into the passed-through ballast water stream. The injector makes use of Bernoulli's principle to achieve the region of increased velocity, which is a region of reduced static pressure compared to the static pressure at the inlet of the injector. One example of an injector comprises a bent or curved pipe in order to achieve the velocity change of the passed-through ballast water.

In embodiments, a Venturi injector is used as the injector according to the present disclosure. As a non-limiting example, a Venturi injector applicable to the present application is obtainable from Mazzei Injector Company, LLC, Bakersfield, Calif., US, e. g. as Injector Model 484, for relatively low volume rates per hour. An injector working according to the same principle may be appropriately chosen for higher volume rates per hour of the passed-through ballast water according to the specific need. For example, volume rates per hour that the present application is applicable to can be greater than 100 $m^3/h$, for example greater than 500 $m^3/h$ and about 1000 $m^3/h$, but not limited thereto.

Transporting between the first location and the second location, as used herein, generally comprises selectively transporting from the first location to the second location, or from the second location to the first location. However, the transporting may also be limited to either transporting from the first location to the second location or from the second location to the first location. Typically, the first location is a natural water reservoir such as a saline water body, or the first location is in connection with such a natural water reservoir. Further typically, the second location is a part of a seaborne ballast water system, such as a ballast water tank of a seagoing vessel.

In embodiments, the non-thermal (streamer type) discharge is a dielectric barrier discharge (DBD), a pulsed corona discharge or an arc-less discharge fed by a pulsed energy source. Non-thermal, as used herein, involves generally a discharge in which no arcing occurs. In the exemplary case of a dielectric barrier discharge, a dielectric for producing the dielectric barrier discharge may be, but is not limited to, silica glass, quartz glass, alumina, and vitreous enamel. In embodiments, at least one electrode of the plasma generation device is at least partially covered with the dielectric.

A non-thermal discharge, i. e. a streamer-type discharge, is different from an arc-type discharge and different from a corona-type discharge. For example, a dielectric barrier discharge occurs as a fast ionizing front mechanism (the 'streamer' regime): An ionization is stimulated by an avalanche of electrons which leads to a distribution of carrier charges by the avalanche. A streamer head having a high charge moves forward inside the generated field. The field is shielded by the streamer head (i.e. the most of the field drops off in the streamer head region) and the streamer moves in the overall field. At the streamer head, the described electron acceleration processes and ionization is taking place. The plasma is generated as a non-equilibrium (non-LTE) plasma. Apart from dielectric barrier discharges, further examples of non-thermal discharges, i. e. streamer regime discharges, include pulsed Corona discharges, capacitively coupled discharges and inductively coupled discharges. Detailed description of streamer regime discharges can be derived, for example, from the publication "Fridman, Alexander, 'Plasma Chemistry', Cambridge University Press, 2012."

In other words: the electrical energy of the discharge is primarily transferred to electrons that are elevated in temperature (e. g. to temperatures of more than $10^3$ K), whereas the heavier gas components (atoms, molecules, ions) stay at temperatures close to the ambient temperature of e. g. <400 K. The electrons at the elevated temperature inelastically collide with the heavier gas components. In this collision and subsequent chemical reactions, active oxidants are produced. An active oxidant may, for example, include ozone, but also excited molecules and radicals.

Active oxidants exhibit a comparatively short effective lifetime. Ozone has a lifetime that is, in the aqueous phase, short compared to the lifetime of chlorine. In the present application, the treated gas at the treated-gas outlet is provided substantially without any buffering, in particular entirely without any buffering, i. e. without being stored in a tank or the like. Rather, the treated gas is introduced, by the gaseous connection between the treated-gas outlet of the plasma generation device and the injector gas inlet of the injector, directly into the ballast water transport line. Thus, the treatment in the ballast water treatment apparatus described herein is effective in view of the disinfection performance and the degree of utilization of the active oxidants produced by the plasma generation device.

In embodiments, substantially the entirety of ballast water, typically the entirety of ballast water, that is transported by the ballast water treatment apparatus is transported through the at least one injector. For example, more than 99.9% of the ballast water that is transported by the ballast water treatment apparatus is transported through the at least one injector. In this aspect, no branch line or bypass line is provided in the ballast water treatment apparatus.

In embodiments, a gas pressure in the discharge area is reduced to within a range of 0.2 $p_{BW}$ to 0.9 $p_{BW}$, optionally within a range of 0.5 $p_{BW}$ to 0.8 $p_{BW}$, wherein $p_{BW}$ is the pressure (i.e. water pressure) inside the ballast water transport line. As a non-limiting example and for illustration purposes, assuming that static water pressure in the ballast water transport line before entering the injector is in a range between 300 kPa and 1 MPa, the static pressure in the discharge area is about 250 kPa. For igniting the non-thermal discharge, i. e streamer type discharge, a critical voltage has to be exceeded on the discharge electrodes. The critical voltage increases with an increase of the gas pressure. At elevated pressures and for a given electrical voltage, the amount of active oxidants, such as ozone, is reduced. In the present aspect, the pressure is reduced with respect to the pressure that exists in the ballast water transport line. The pressure reduction is typically due to the Bernoulli Effect inherent to injectors such as Venturi-type injectors. A pressure reduction of the gas in the discharge area allows for a non-thermal discharge, i. e. streamer type discharge, that produces a suitable amount of active oxidants at a comparatively low voltage, leading to low losses e. g. in the semiconductors used for voltage generation and to lower insulation requirements.

As a non-limiting example, a power supply provides a (pulsed) voltage of approximately 10 kV. A typical pressure of the ballast water inside the ballast water transport line amounts to approximately 350-500 kPa. By utilizing the Bernoulli Effect in the at least one Venturi injector, where the velocity of the passed-through water is accelerated in the acceleration region, the stationary gas pressure in the discharge area of the plasma generation device is lowered, e. g. to approximately 250 kPa, allowing for a good yield in active oxidant production.

In embodiments, the plasma generation device comprises a discharge pipe configured to have the feed gas passed through a feed gas passage. Typically, the discharge area is arranged in the feed gas passage. In typical configurations, the feed gas passage has a uniform diameter throughout the elongation of the discharge area.

Generally, a discharge pipe can have a cylindrical coaxial geometry, a plate to plate geometry or other possible geometries. In an embodiment using the cylindrical coaxial geometry, a discharge pipe has an internal electrode, such as an electrode wire, that is on high voltage potential, and an external grounded electrode. The external grounded electrode may be a laminar electrode arranged on a wall of a cylindrical support structure of the discharge pipe. In another embodiment, a discharge pipe has two laminar electrodes, each electrode being arranged on the outside of a cylindrical support structure of the discharge pipe. In even another embodiment, the inner electrode can be arranged on the inside of the inner dielectric cylinder leading to a system with two dielectric barriers. The high voltage potential is applied to one of the electrodes. In either embodiment, the cylindrical support structure may be the dielectric involved in the non-thermal discharge, i. e. streamer type discharge, such as but not limited to the dielectric barrier discharge.

A discharge pipe may contribute to a simple arrangement in which the treated gas is effectively injected into the ballast water stream.

In embodiments, the treated-gas outlet of the discharge pipe opens out into the constricted area of the liquid passage of the injector and is arranged to provide a tangential component of the treated gas flowing out of the treated-gas outlet with respect to the water passed through the liquid passage of the injector. A tangential component can be achieved, for example, by tilting the treated-gas outlet or by bending the discharge pipe in the region of the treated-gas outlet. Then, the gas flow trajectory in the feed gas passage, as well as the gas flowing out of the treated-gas outlet in the vicinity of the treated-gas outlet, have a tangential component to the water flow. A tangential injection is advantageous for the pressure drop and does not adversely affect the mixing efficiency.

In embodiments, the treated-gas outlet of the discharge pipe is arranged at a distance of less than 100 mm from the passed-through water. Optionally, the treated-gas outlet of the discharge pipe is arranged at a distance of less than 80 mm and more than 5 mm from the passed-through water. Further optionally, the treated-gas outlet of the discharge pipe is arranged at a distance of less than 50 mm and more than 5 mm from the passed-through water.

In other words: The treated-gas outlet or exit of the plasma generation device is positioned in a proximity of the ballast water stream which shall be disinfected during the ballast water transportation process, the proximity fulfilling the conditions disclosed herein. This may help to provide a suitable density of active oxidants to interact with the water stream, which then leads to an efficient oxidative disinfection.

In embodiments, a cross sectional distance, e. g. a radial cross sectional diameter, of the feed gas passage of the discharge pipe has a value between 0.5 mm and 8 mm, optionally between 0.5 mm and 5 mm and preferably approximately 1 mm. In other words: A radial gaseous gap is of the order of between 0.5 mm and 8 mm, preferably approximately 1 mm. This may help to achieve an advantageous critical voltage, or threshold voltage, for the onset of the plasma in the non-thermal discharge, i. e. streamer type discharge.

In embodiments, an absolute value of an amplitude of a voltage applied to obtain the non-thermal discharge, i. e. streamer type discharge, is between 1 kV and 30 kV, optionally between 3 kV and 15 kV. Alternatively or additionally, a voltage applied to obtain the non-thermal discharge, i. e. streamer type discharge, is a pulsed voltage, wherein the pulsed voltage has a pulse frequency between 5 kHz and 200 kHz, optionally between 10 kHz and 100 kHz and typically about 10 kHz. Alternatively or additionally, when the voltage applied to obtain the non-thermal discharge, i. e. streamer type discharge, is a pulsed voltage, such as a unipolar or bipolar pulsed voltage, the pulsed voltage has a pulse duration between 0.1 µs and 5 µs, optionally between 1 µs and 3 µs and preferably about 1 µs.

In embodiments, the ballast water treatment apparatus comprises multiple Venturi injectors. The multiple injectors are connected in parallel. In this configuration, each injector comprises one injector gas inlet or multiple injector gas inlets, as described further below. A parallel configuration may help to effectively mix the treated gas even when the total amount of water per unit time that is transported through the ballast water transport line is high. Alternatively or additionally, multiple injectors may also be connected in series. For example, multiple parallel branches of series-connected injectors may be provided.

In some embodiments, at least one injector comprises multiple injector gas inlets. The multiple injector gas inlets are arranged and connected according to a circular pattern or a helical pattern along a circumference of the ballast water transport line. Multiple injector gas inlets may contribute to an effective mixing of the treated gas and the transported ballast water.

In embodiments, the ballast water treatment apparatus comprises multiple plasma generation devices which are each assigned to one or more of the injector gas inlets. For example, each injector in the case of multiple injectors has assigned a different one of the multiple plasma generation devices; alternatively, multiple injectors are grouped, and each group has assigned a different one of the multiple plasma generation device. In still another example, in the case of multiple injector gas inlets provided on one injector, each injector gas inlet has assigned a different one of the multiple plasma generation devices; alternatively, some injector gas inlets of the one injector are grouped, and each group has assigned a different one of the multiple plasma generation device.

In embodiments, the ballast water treatment apparatus comprises a voltage generator supplying one or more of the multiple plasma generation devices and at least one further generator supplying a different one or different ones of the multiple plasma generation devices. The voltage generator has a voltage parameter that is adjustable independent from a corresponding voltage parameter of the further voltage generator. A voltage parameter may include an absolute value of the output voltage, a pulse frequency of the output voltage, and/or a pulse duration of the output voltage. By an independent adjustment, a spatially distributed gas concentration of active oxidants, such as ozone, can be determined, which may help to optimize the disinfection process.

In embodiments, the ballast water treatment apparatus further comprises a feed gas drying device. By employing a feed gas drying device, the feed gas, such as air, may be dried to a dew point below −40° C., typically below −70° C. With a dry feed gas, generation of specific undesired molecules can be avoided. Radicals stemming from e. g. humid air as a feed gas may include nitric acid ($HNO_3$), which is relatively stable, highly corrosive and biologically hazardous. In contrast, e.g. ozone that is created in higher concentration with dry air is known to self-degrade to non-hazardous molecules in a relatively short period of time, which may be advantageous to shorten a ballast water discharge time after the disinfection in the disinfection stage is complete.

According to a further aspect of the present disclosure, a ballast water system is provided. The ballast water system comprises a ballast water treatment apparatus as described herein and a ballast water tank. The first location is in liquid connection with a natural water reservoir. The second location is in liquid connection with the ballast water tank. A liquid connection allows liquids to pass through the connection.

Injecting the effluent of a non-thermal plasma permits a well-controlled in-situ production of active oxidants, regardless of the ballast water conditions, e.g. its salinity, turbidity, temperature etc. This is an improvement over electrolytic or UV-catalytic ballast water disinfection in which the water to be treated will influence the production of oxidants. The presently described configuration also has an improvement over the case where the plasma (either non-equilibrium or thermalized) is ignited directly inside the water to be treated; in that a case, an additional disadvantage is that the electric load will strongly vary with the water quality thus challenging the robustness of the process. These and other disadvantages are avoided in the present configuration of the invention and its embodiments.

The use of a non-thermal discharge, i. e. streamer type discharge, driven by pulses permits to 'tune' online the production of active oxidants, thus maximizing the production of a specific oxidant. Pulses may be unipolar pulses or bipolar pulses, i. e. pulses changing the polarity of the voltage alternatingly.

The treated-gas outlet is placed in the proximity of the water stream. This significantly reduces fouling processes, such as due to interaction with the ballast, in contrast to the UV or UV-enhanced catalysis disinfection methods in the conventional prior art. Furthermore, this permits to make use of short-lived oxidants for the disinfection action. In other methods where the oxidants have a rather long life-time, the respective oxidant generation stage is placed in a distance larger by orders of magnitude, and has to be buffered. However, in the present configuration the plasma is ignited in direct vicinity to the water to be treated.

Furthermore, the disclosed solution allows installation of the system without significant pressure drop, thereby increasing the efficiency and making retrofit applications possible.

BRIEF DESCRIPTION OF THE DRAWINGS

Embodiments of the disclosure will be described with reference to the drawings, in which.

EMBODIMENTS OF THE DISCLOSURE

Figure 1:
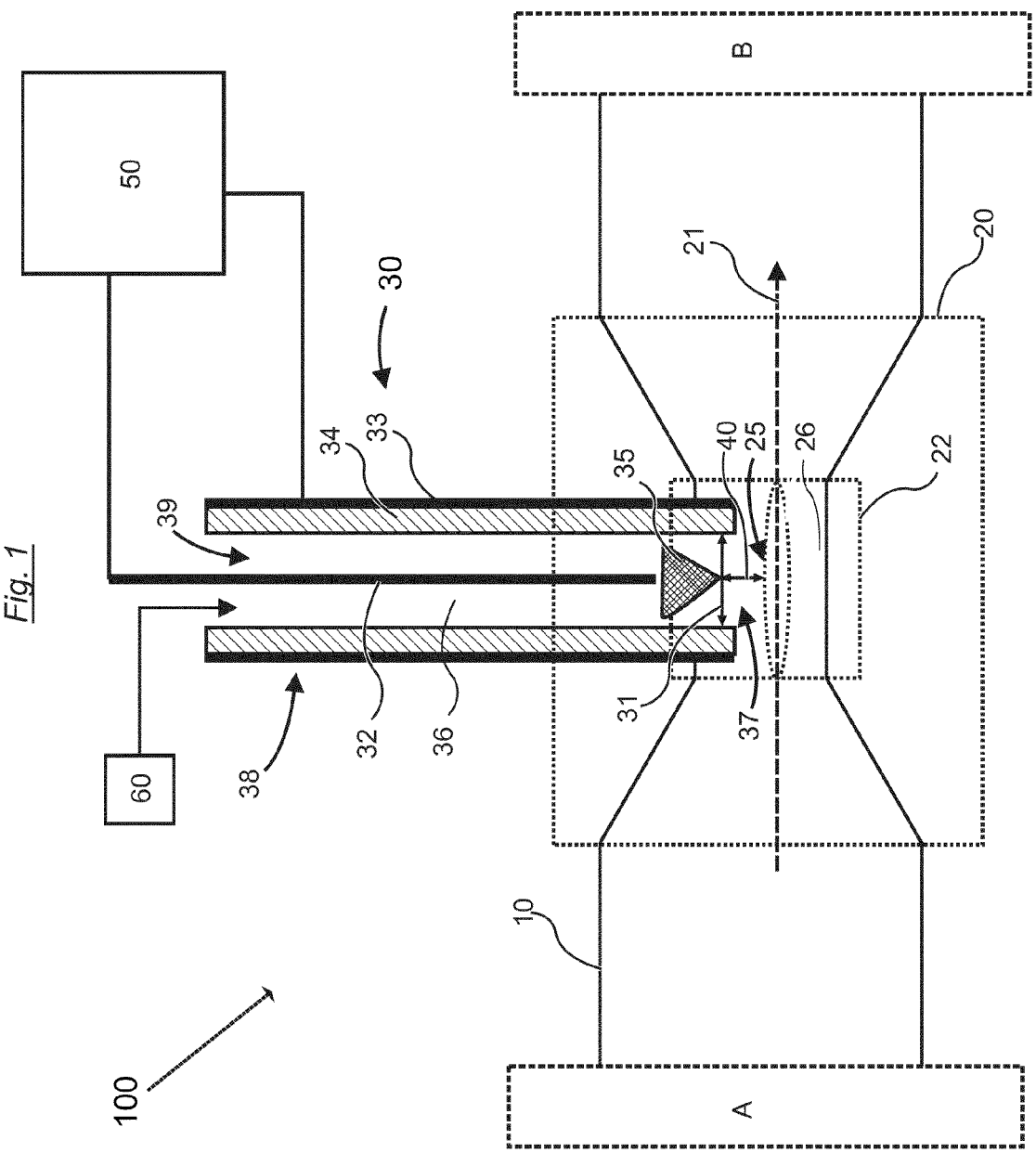
FIG. 1 is a schematic view of a ballast water treatment apparatus according to an embodiment of the present disclosure.

FIG. 1 is a schematic view of a ballast water treatment apparatus 100 according to an embodiment of the present disclosure. A ballast water transport line 10 is provided between a first location A and a second location B. For example, the first location A is a natural sea body such as an ocean; the second location B is exemplified as a storage part of a ballast water system 1, for example, the second location B is the inside of a ballast water tank.

For completeness and not shown in FIG. 1, a filtration stage may be arranged for filtering the water from the first location A flowing into the ballast water treatment apparatus 100. Also, a filtration stage may be part of the presently described the ballast water treatment apparatus 100.

Arranged within the ballast water transport line 10 is an injector 20, such as a Venturi injector. The injector 20 includes a liquid passage 21 through which the ballast water that is to be transported between the first location A and the second location B is passed through. In the present embodiment, the liquid passage 21 has a constricted area 22 that is constructed such that a velocity of the passed-through ballast water is increased within a region 26 of increased velocity. An inlet allowing for the introduction of a gas to be mixed with the passed-through ballast water, referred to as an injector gas inlet 25 (see FIG. 2, 3), is provided in the region 26 of increased velocity.

Due to the ballast water stream velocity in the region 26 of increased velocity, a suction effect is induced at the injector gas inlet 25, thereby reducing the gas flow requirements: When compared to a configuration where the region 26 of increased velocity is not provided, the presently described configuration allows for under-dimensioning a gas supply pump (not shown) for supplying a feed gas. Additionally, turbulences occurring in the region 26 of increased velocity contribute to a fast mixing of gas sucked in at the injector gas inlet 25. Furthermore, the present configuration creates virtually no large phase-separated regions. In addition, very small bubbles of the sucked gas are created inside the ballast water stream, which advantageously lead to an improved diffusion of the active oxidants into the transported ballast water.

A plasma generation device 30 is further provided. The plasma generation device 30 is fed with a feed gas, preferably with a feed gas that comprises oxygen ($O_2$). Examples of a feed gas include dry air or technically dried air, but are not limited thereto. In the exemplary embodiment of FIG. 1, a feed gas drying device 60 is provided that technically dries the feed gas, e. g. air, to have a dew point below −40° C.

The plasma generation device 30 in the embodiment depicted in FIG. 1 is constructed as a discharge pipe 38 having a gas gap 31 of about 1 mm, and includes a high voltage electrode 32 and a ground electrode 33. It is noted that the ground electrode may also be the electrode 32, and the high voltage electrode may also be the electrode 33. For the sake of convenience, herein and as exemplary embodiment only, the electrode 32 is assumed to be on a (pulsed) high voltage potential, and the electrode 33 is grounded.

A support structure of the plasma generation device 30 forms a dielectric barrier 34 between the high voltage electrode 32 and the ground electrode 33. Between the high voltage electrode 32 and dielectric barrier 34, a discharge area 36 is formed in which, upon application of a high voltage between the electrodes 32, 33, a streamer-type plasma 35 is induced. The plasma 35 leads to a generation of a treated gas that is provided at a treated-gas outlet 37.

For the application of the high voltage, a high voltage pulse generator 50 is provided that is in electrical connection with the electrodes 33, 34. The pulse generator 50 is configured to provide high voltage pulses having an absolute value of about 10 kV between the electrodes 33, 34.

The treated gas comprises, among others, ozone ($O_3$) as an active oxidant. The treated-gas outlet 37 is arranged to be in a gaseous connection with the injector gas inlet 25. Thereby, upon transportation of ballast water through the transport line 10 and the Venturi injector 20, the Venturi injector 20 forms a "jet&mix" structure in which the treated gas is effectively mixed and distributed inside the ballast water stream.

In the embodiment of FIG. 1, the treated-gas outlet 37 is arranged at a distance of approximately 50-80 mm from the stream of the passed-through water in the acceleration region or region of increased water stream velocity 26. Thereby, a suitable amount of active oxidants, such as ozone, is available to interact with the water stream.

Figure 2:
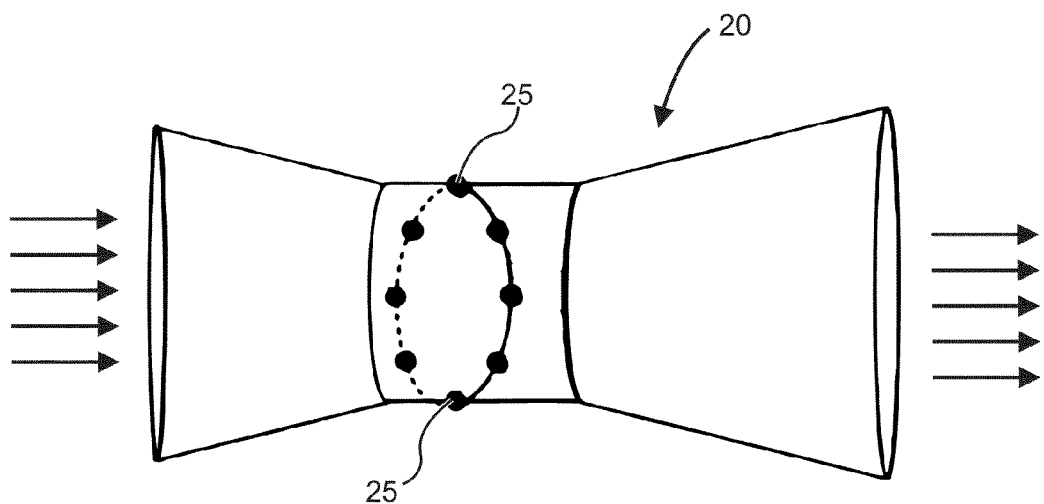
FIG. 2 is a schematic side view of a Venturi injector used in an embodiment of the present disclosure having multiple injector gas inlets arranged in a circular pattern.
Figure 3:
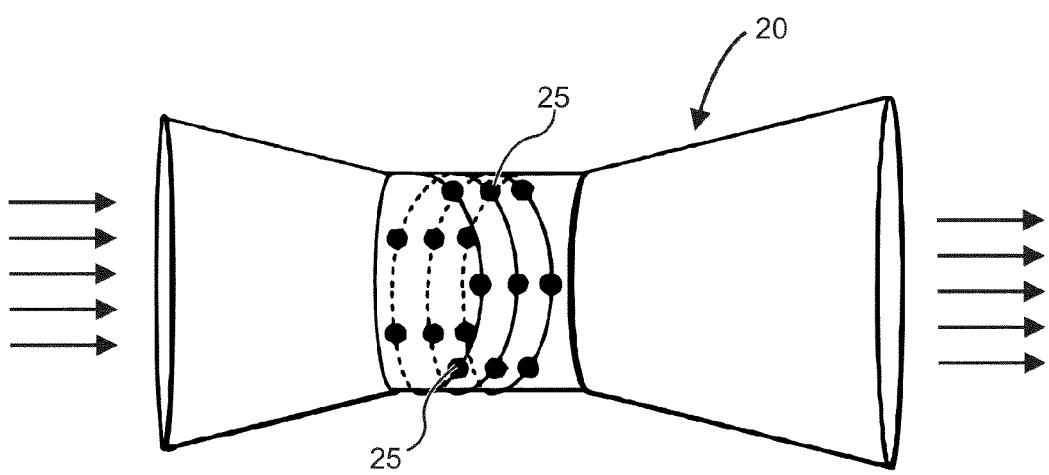
FIG. 3 is a schematic side view of a Venturi injector used in an embodiment of the present disclosure having multiple injector gas inlets arranged in a helical pattern.

FIGS. 2 and 3 each are schematic side views of a Venturi injector 20 used in an embodiment of the present disclosure. The Venturi injector 20 has multiple injector gas inlets 25 that are schematically depicted as circles. In each of FIGS. 2 and 3, two injector gas inlets 25 have been assigned a reference numeral for sake of simplicity; however, it is understood that each of the circles represents one of the multiple gas inlets 25. The connecting lines between circles are for visualization purposes only. The number of multiple injector gas inlets 25 is not limited to that shown in FIG. 2 or 3, and different numbers of multiple injector gas inlets 25 can be used. The multiple injector gas inlets 25 in FIG. 2 are arranged in a circular pattern. In FIG. 3, the multiple injector gas inlets 25 are arranged in a helical or cylindrical pattern. These arrangements may help to ensure an advantageous mixing of the treated gas and the ballast water.

Figure 4:
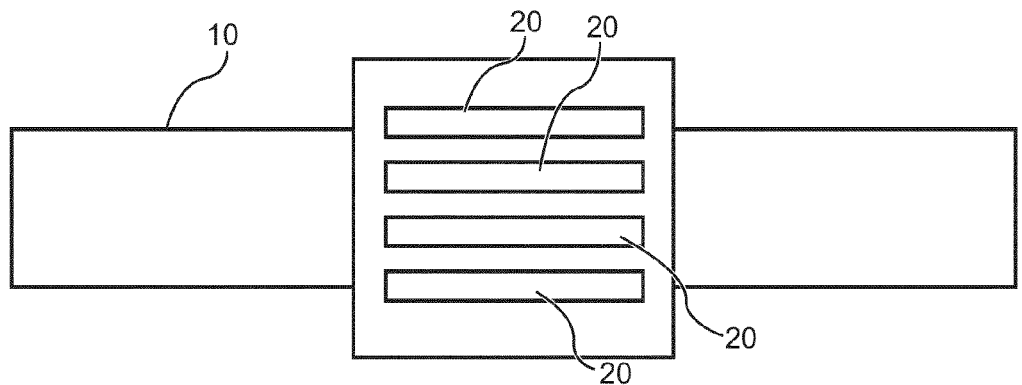
FIG. 4 is a schematic partial view of a ballast water treatment apparatus according to an embodiment of the present disclosure, comprising multiple Venturi injectors stacked in a parallel configuration.

FIG. 4 is a schematic partial view of a ballast water treatment apparatus 100 according to an embodiment of the present disclosure. The ballast water treatment apparatus 100 comprises a ballast water transport line 10 and multiple Venturi injectors 20 stacked in a parallel configuration. In FIG. 4 not all components of the ballast water treatment apparatus 100 are shown, and the further components are, for example, present, in particular arranged and configured, as in the embodiment shown in FIG. 1. The number of multiple injectors 20 is not limited to that shown in FIG. 4, and different numbers of multiple injectors 20 may be used.

Figure 5:
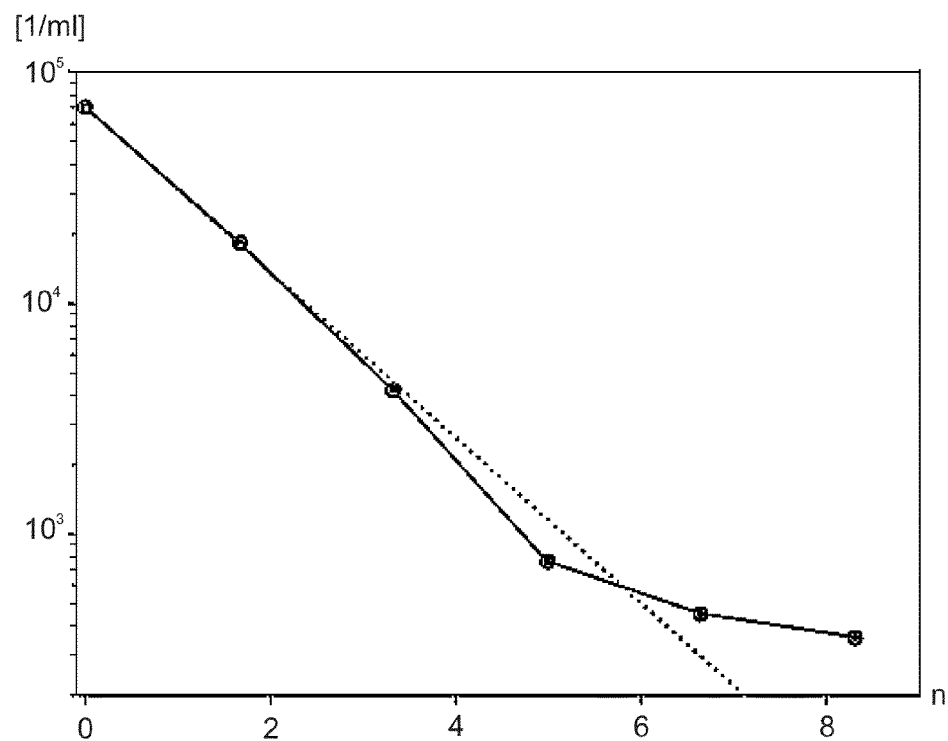
FIG. 5 is a diagram showing experimental treatment results for a biological species that has undergone a treatment by a ballast water treatment apparatus.

FIG. 5 is a diagram showing experimental treatment results for a biological species that has undergone a treatment by a ballast water treatment apparatus as disclosed herein. In FIG. 5, the abscissa shows a number of treatments applied to a solution containing the biological species, and the ordinate shows the concentration of the biological species within the solution per milliliter. Similar results as shown in FIG. 5 are obtainable by varying the voltage pulse frequency instead of increasing the number of treatments, for example. A number of treatments may also be achieved by multiple injectors 20 connected in series. The measurement results in FIG. 5 may assist in defining an optimal configuration, for example by changing the treatment strength (number of treatments, voltage pulse frequency and the like) shown on the abscissa.

As to the results of FIG. 5, a Marine microalgae organism, *Tetraselmis suecica*, was obtained from the microbiology and parasitology department of the University of Santiago de Compostela (Spain). The algae cultures were maintained at 20-22° C. with constant air flow.

For each algae batch, a calibration curve was created. A set of standard dilutions from the stock algae solution with salt water (using marine salt, e.g. Tetra marine sea salt) was first prepared. Then, the cell concentration was determined using direct microscopic cell counts. For that, an improved Neubauer cell counting chamber was used. 25-50 μl of Lugol's fixation agent was added to the sample prior to microscopic observation. Thereafter, the OJIP (fluorescence curve of chlorophyll) and optical density (OD) were measured by using a fluorimeter (AquaPen-C AP-C 100, Photo Systems Instruments Inc.). The samples were kept in the dark for 10 minutes before measuring OJIP. The parameter in OJIP protocol that is sensitive to the number of living cells is called fixed area. Therefore, the calibration curve was prepared by plotting the fixed area as function of the algae concentration. Moreover, Fv/Fm parameter (Fv=difference between initial fluorescence immediately after illumination and largest fluorescence Fm at a later stage) in OJIP protocol measures the physiological state (health) of the photosynthetic system in algae cells.

Different batches of *Tetraselmis* have been tested in the treatment device. In all cases, the present inventors found an exponential decrease of the concentration of living algae with the number of applied treatments or the strength of the applied treatment (concentration of radicals, e.g. controlled by the discharge frequency). In FIG. 5, an exponential decrease is in accordance with Chick's law, which predicts such a dependence on the product of the concentration multiplied by the reaction time. The decay constant of the algae in such a treatment has been found to depend strongly on the health state of the algae (as given by the mentioned Fv/Fm parameter).

The invention claimed is:

1. A ballast water treatment apparatus, comprising:
   a ballast water transport line configured to transport ballast water between a first location and a second location, the transported ballast water being passed through at least one injector;
   a plasma generation device configured to be fed with a feed gas, and configured to generate a feed gas plasma by a streamer type discharge in a discharge area to provide a treated gas at a treated-gas outlet;
   wherein the at least one injector comprises a liquid passage being configured for passing through the transported ballast water and having an area constructed such as to increase a velocity of the passed-through water in a region of increased velocity, thus reducing a static pressure, and injector gas inlet provided in the region with increased velocity;
   wherein at least one injector comprises multiple injector gas inlets, the multiple injector gas inlets being arranged and connected according to a circular pattern or a helical pattern or a cylindrical pattern along a circumference of the at least one injector; and
   wherein the treated-gas outlet is in gaseous connection with the injector gas inlet such that the treated gas is sucked into the passed-through ballast water for introducing and mixing the treated gas into the passed-though water in the liquid passage.

2. The ballast water treatment apparatus according to claim 1, wherein the at least one injector is a Venturi injector.

3. The ballast water treatment apparatus according to claim 1, wherein the feed gas comprises oxygen.

4. The ballast water treatment apparatus according to claim 1, wherein the ballast water treatment apparatus is configured such that an entirety of the ballast water that is transported by the ballast water treatment apparatus is transported through the at least one injector.

5. The ballast water treatment apparatus according to claim 1, wherein a gas pressure in the discharge area is within a range of 0.2 pBw to 0.9 pBw, wherein pBw is the pressure inside the ballast water transport line.

6. The ballast water treatment apparatus according to claim 1, wherein the plasma generation device comprises a discharge pipe configured to pass the feed gas through a feed gas passage.

7. The ballast water treatment apparatus according to claim 6, wherein the treated-gas outlet of the discharge pipe opens out into the area of the liquid passage of the injector, wherein the treated-gas outlet is arranged to provide a tangential component of the treated gas flowing out of the treated-gas outlet with respect to the water passed through the liquid passage of the injector.

8. The ballast water treatment apparatus according to claim 6, wherein the treated-gas outlet of the discharge pipe is arranged at a distance of less than 100 mm from the passed-through water.

9. The ballast water treatment apparatus according to claim 6, wherein a cross sectional distance of the feed gas passage of the discharge pipe has a value between 0.5 mm and 8 mm.

10. The ballast water treatment apparatus according to claim 1, wherein an absolute value of an amplitude of a voltage applied to the plasma generation device to obtain the streamer type discharge is between 1 kV and 30 kV.

11. The ballast water treatment apparatus according to claim 1, comprising multiple Venturi injectors, the multiple Venturi injectors being arranged and connected in parallel.

12. The ballast water treatment apparatus according to claim 11, comprising multiple plasma generation devices each assigned to one of the injector gas inlets.

13. The ballast water treatment apparatus according to claim 11, wherein the plasma generation device comprises multiple plasma generation devices, and further comprising a voltage generator supplying one or more of the multiple plasma generation devices and at least one further voltage generator supplying a different one or different ones of the multiple plasma generation devices, the voltage generator having a voltage parameter that is adjustable independent from a corresponding voltage parameter of the further voltage generator.

14. A ballast water system comprising a ballast water treatment apparatus according to claim 1 and a ballast water tank, the first location being in a liquid connection with a natural water reservoir and the second location being in liquid connection with the ballast water tank.

15. The ballast water treatment apparatus according to claim 1, wherein a voltage applied to the plasma generation device to obtain the streamer type discharge is a pulsed voltage, wherein the pulsed voltage has a pulse frequency between 5 kHz and 200 kHz.

16. The ballast water treatment apparatus according to claim 15 wherein the pulsed voltage has a pulse duration between 0.1 ps and 5 ps.

17. The ballast water treatment apparatus according to claim 1, wherein the ballast water treatment apparatus further comprising a feed gas drying device.

18. The ballast water treatment apparatus according to claim 16, wherein the pulsed voltage has a pulse frequency between 10 kHz and 100 kHz.

19. The ballast water treatment apparatus according to claim 17, wherein the pulsed voltage has a pulse duration between 1 ps and 3 ps.

* * * * *